United States Patent
Kim et al.

(10) Patent No.: US 10,234,941 B2
(45) Date of Patent: Mar. 19, 2019

(54) WEARABLE SENSOR FOR TRACKING ARTICULATED BODY-PARTS

(71) Applicant: MICROSOFT TECHNOLOGY LICENSING, LLC, Redmond, WA (US)

(72) Inventors: David Kim, Cambridge (GB); Shahram Izadi, Cambridge (GB); Otmar Hilliges, Cambridge (GB); David Alexander Butler, Cambridge (GB); Stephen Hodges, Cambridge (GB); Patrick Luke Olivier, York (GB); Jiawen Chen, Cambridge (GB); Iason Oikonomidis, Heraklion (GR)

(73) Assignee: Microsoft Technology Licensing, LLC, Redmond, WA (US)

(*) Notice: Subject to any disclaimer, the term of this patent is extended or adjusted under 35 U.S.C. 154(b) by 41 days.

(21) Appl. No.: 13/644,701

(22) Filed: Oct. 4, 2012

(65) Prior Publication Data
US 2014/0098018 A1    Apr. 10, 2014

(51) Int. Cl.
*G06F 3/01* (2006.01)
*G06F 3/03* (2006.01)

(52) U.S. Cl.
CPC .............. *G06F 3/014* (2013.01); *G06F 3/017* (2013.01); *G06F 3/0304* (2013.01); *G06F 3/015* (2013.01)

(58) Field of Classification Search
CPC ........ G06F 3/011; G06F 3/015; G06F 3/0488; G06F 3/041; G06F 3/017; G06F 3/014; G06K 3/033; G06K 9/00

(Continued)

(56) References Cited

U.S. PATENT DOCUMENTS

| | | | | |
|---|---|---|---|---|
| 6,125,197 A * | 9/2000 | Mack | ................. | H04N 13/0221 256/12 |
| 6,269,172 B1 * | 7/2001 | Rehg | ................. | G06K 9/00369 342/1 |

(Continued)

FOREIGN PATENT DOCUMENTS

| | | |
|---|---|---|
| CN | 101093582 A | 12/2007 |
| CN | 102541258 A | 7/2012 |

(Continued)

OTHER PUBLICATIONS

Borst, et al., "A Spring Model for Whole-Hand Virtual Grasping", In Journal: Teleoperators and Virtual Environments—Presence, vol. 15, No. 1, Feb. 2006, 15 pages.

(Continued)

*Primary Examiner* — Michael A Faragalla
*Assistant Examiner* — Sujit Shah

(57) ABSTRACT

A wearable sensor for tracking articulated body parts is described such as a wrist-worn device which enables 3D tracking of fingers and optionally also the arm and hand without the need to wear a glove or markers on the hand. In an embodiment a camera captures images of an articulated part of a body of a wearer of the device and an articulated model of the body part is tracked in real time to enable gesture-based control of a separate computing device such as a smart phone, laptop computer or other computing device. In examples the device has a structured illumination source and a diffuse illumination source for illuminating the articulated body part. In some examples an inertial measurement unit is also included in the sensor to enable tracking of the arm and hand

20 Claims, 16 Drawing Sheets

(58) Field of Classification Search
USPC ........... 345/156–184, 345; 382/103; 361/679
See application file for complete search history.

(56) References Cited

U.S. PATENT DOCUMENTS

| | | | |
|---|---|---|---|
| 7,731,364 B2* | 6/2010 | Peyman .................... | 351/246 |
| 7,889,195 B2 | 2/2011 | Shih et al. | |
| 8,203,502 B1* | 6/2012 | Chi et al. ................... | 345/7 |
| 8,228,315 B1 | 7/2012 | Starner et al. | |
| 8,381,135 B2 | 2/2013 | Hotelling et al. | |
| 8,515,128 B1 | 8/2013 | Hildreth | |
| 8,576,073 B2 | 11/2013 | Mooring et al. | |
| 8,760,426 B1 | 6/2014 | Strand et al. | |
| 9,172,996 B2 | 10/2015 | Igoe et al. | |
| 2002/0024500 A1* | 2/2002 | Howard .................. | G06F 3/014 345/158 |
| 2003/0095109 A1 | 5/2003 | Sasaki et al. | |
| 2004/0263473 A1* | 12/2004 | Cho et al. ................ | 345/156 |
| 2008/0192059 A1 | 8/2008 | Kennedy | |
| 2009/0146947 A1 | 6/2009 | Ng | |
| 2009/0243998 A1 | 10/2009 | Wang | |
| 2009/0245591 A1* | 10/2009 | Rowe ................... | G06K 9/2018 382/115 |
| 2009/0322671 A1 | 12/2009 | Scott et al. | |
| 2009/0322673 A1* | 12/2009 | Cherradi El Fadili ..................... | G06F 3/017 345/157 |
| 2010/0020078 A1* | 1/2010 | Shpunt .................... | 345/420 |
| 2010/0199232 A1* | 8/2010 | Mistry et al. ............... | 715/863 |
| 2011/0129124 A1* | 6/2011 | Givon .................... | 382/107 |
| 2011/0134114 A1* | 6/2011 | Rais et al. .................... | 345/419 |
| 2011/0138277 A1 | 6/2011 | Grant et al. | |
| 2011/0158508 A1* | 6/2011 | Shpunt et al. ................ | 382/154 |
| 2011/0199296 A1 | 8/2011 | Simpson | |
| 2011/0199335 A1 | 8/2011 | Li et al. | |
| 2011/0210931 A1 | 9/2011 | Shai | |
| 2011/0267265 A1* | 11/2011 | Stinson ................. | G06F 3/0304 345/157 |
| 2011/0296357 A1 | 12/2011 | Kim | |
| 2012/0025945 A1* | 2/2012 | Yazadi et al. ................ | 340/4.2 |
| 2012/0075086 A1 | 3/2012 | Takasu | |
| 2012/0104284 A1* | 5/2012 | Verschuren ............... | 250/492.1 |
| 2012/0113062 A1 | 5/2012 | Briden et al. | |
| 2012/0117514 A1 | 5/2012 | Kim et al. | |
| 2012/0127164 A1* | 5/2012 | Rhee ..................... | G06T 17/00 345/419 |
| 2012/0176655 A1* | 7/2012 | Shirakura ............ | G03H 1/2205 359/32 |
| 2012/0206414 A1 | 8/2012 | Tada et al. | |
| 2012/0224093 A1 | 9/2012 | Chou | |
| 2012/0236025 A1* | 9/2012 | Jacobsen et al. ............ | 345/629 |
| 2012/0242586 A1 | 9/2012 | Krishnaswamy et al. | |
| 2013/0135260 A1 | 5/2013 | Damhaug et al. | |
| 2013/0278631 A1 | 10/2013 | Border et al. | |
| 2013/0290427 A1 | 10/2013 | Proud | |
| 2013/0328928 A1 | 12/2013 | Yamagishi et al. | |
| 2014/0028550 A1* | 1/2014 | Adhikari ..................... | 345/156 |
| 2014/0035736 A1 | 2/2014 | Weddle et al. | |
| 2014/0160078 A1 | 6/2014 | Seo et al. | |
| 2014/0173921 A1 | 6/2014 | Gros et al. | |
| 2014/0240103 A1 | 8/2014 | Lake et al. | |
| 2014/0240242 A1 | 8/2014 | Kawalkar et al. | |
| 2014/0240708 A1 | 8/2014 | Matsushita et al. | |
| 2014/0267169 A1 | 9/2014 | Mckiel, Jr. | |
| 2015/0022438 A1 | 1/2015 | Hong | |
| 2015/0026647 A1 | 1/2015 | Park et al. | |
| 2015/0031333 A1 | 1/2015 | Lee | |
| 2015/0032418 A1 | 1/2015 | Akiyama et al. | |
| 2015/0067824 A1 | 3/2015 | Chatterton et al. | |
| 2015/0074797 A1 | 3/2015 | Choi et al. | |
| 2015/0084884 A1* | 3/2015 | Cherradi El Fadili ..................... | G06F 3/041 345/173 |
| 2015/0177947 A1 | 6/2015 | Shen et al. | |
| 2015/0185850 A1 | 7/2015 | Guilak et al. | |
| 2015/0242015 A1 | 8/2015 | Cho et al. | |
| 2015/0261373 A1 | 9/2015 | Smus | |
| 2015/0293592 A1 | 10/2015 | Cheong et al. | |
| 2016/0018900 A1 | 1/2016 | Tu et al. | |
| 2016/0085329 A1 | 3/2016 | Yim et al. | |
| 2016/0110012 A1 | 4/2016 | Yim et al. | |
| 2016/0320850 A1 | 11/2016 | Thadani et al. | |
| 2017/0010695 A1 | 1/2017 | Pahud et al. | |
| 2017/0010733 A1 | 1/2017 | Pahud et al. | |
| 2017/0090666 A1 | 3/2017 | Pahud et al. | |
| 2017/0153741 A1 | 6/2017 | Ofek et al. | |

FOREIGN PATENT DOCUMENTS

| | | |
|---|---|---|
| WO | 9940562 A1 | 8/1999 |
| WO | 0203316 A1 | 1/2002 |
| WO | 2008010024 A1 | 1/2008 |
| WO | 2014189225 A1 | 11/2014 |

OTHER PUBLICATIONS

Rekimoto, Jun, "GestureWrist and GesturePad: Unobtrusive Wearable Interaction Devices", In Proceedings of 5th IEEE International Symposium on Wearable Computers, Oct. 8, 2001, 7 pages.

Henderson, Edward Nelson, "An Inertial Measurement System for Hand and Finger Tracking", Published on: Dec. 2011, Available at: http://scholarworks.boisestate.edu/cgi/viewcontent.cgi?article=1233&context=td.

Dominguez, et al., "A Robust Finger Tracking Method for Multimodal Wearable Computer Interfacing", In Proceedings of IEEE Transactions on Multimedia, vol. 8, No. 5, Oct. 2006, 17 pages.

Dang, et al., "Usage and Recognition of Finger Orientation for Multi-Touch Tabletop Interaction", In 13th IFIP TC 13 International Conference on Human-Computer Interaction—vol. Part III, Sep. 5, 2011, 18 pages.

Butler, et al., "SideSight: Multi-"touch" Interaction Around Small Devices", In 21st Annual ACM Symposium on User Interface Software and Technology, Oct. 19, 2008, 4 pages.

Terajima, et al., "Fast Finger Tracking System for In-air Typing Interface", In Proceedings of 27th International Conference on Human Factors in Computing Systems, Apr. 4, 2009, 6 pages.

Cipolla, et al., "Hand Tracking using a Quadric Surface Model", Retrieved on: Aug. 6, 2012, Available at: http://cms.brookes.ac.uk/staff/PhilipTorr/Papers/MOS/overview_paper.pdf.

Pamplona, et al., "The Image-Based Data Glove", In X Symposium on Virtual Reality, May 13, 2008, 8 pages.

Harrison, et al., "OmniTouch: Wearable Multitouch Interaction Everywhere", In Symposium on User Interface Software and Technology, Oct. 16, 2011, 10 pages.

Lee, et al., "Handy AR: Markerless Inspection of Augmented Reality Objects using Fingertip Tracking", In Proceedings of In 11th International Symposium on Wearable Computers, Oct. 11, 2007, 8 pages.

Gustafson, et al., "Imaginary Phone: Learning Imaginary Interfaces by Transferring Spatial Memory from a Familiar Device", In Symposium on User Interface Software and Technology, Oct. 16, 2011, 10 pages.

Saponas, et al., "Enabling Always-Available Input with Muscle-Computer Interfaces", In Symposium on User Interface Software and Technology, Oct. 4, 2009, 10 pages.

Villar, et al., "Mouse 2.0: Multi-touch Meets the Mouse", In Symposium on User Interface Software and Technology, Oct. 4, 2009, 9 pages.

"International Search Report & Written Opinion for PCT Patent Application No. PCT/US2013/060233", dated Aug. 21, 2014, 17 Pages.

Ahmad, et al., "UbiHand: A Wearable Input Device for 3D Interaction", In ACM SIGGRAPH Research Posters, Jul. 30, 2006, 1 Page.

Kim, et al., "Digits: Freehand 3D Interactions anywhere using a Wrist-Worn Gloveless Sensor", In Proceedings of the 25th Annual ACM Symposium on User Interface Software and Technology, Oct. 7, 2012, pp. 167-176.

(56) References Cited

OTHER PUBLICATIONS

"Search Report Issued in European Patent Application No. 16153332. 8", dated May 25, 2016, 13 Pages.
"First Office Action and Search Report Issued in Chinese Patent Application No. 201380052133.7", dated Sep. 27, 2016, 15 Pages.
"Third Office Action Issued in Chinese Patent Application No. 201380052133.7", dated Oct. 20, 2017, 6 Pages.
"Second Office Action Issued in Chinese Patent Application No. 201380052133.7", dated May 10, 2017, 13 Pages.
"Final Office Action Issued in U.S. Appl. No. 14/962,895", dated Jul. 11, 2018, 18 Pages.
"Non Final Office Action Issued in U.S. Appl. No. 14/963,102", dated May 17, 2018, 29 Pages.
"Second Written Opinion Issued in PCT Application No. PCT/US2013/060233", dated Dec. 23, 2014, 7 Pages.
"International Preliminary Report on Patentability Issued in PCT Application No. PCT/US2016/040596", dated Sep. 15, 2017, 18 Pages.
"International Search Report and Written Opinion Issued in PCT Application No. PCT/US2016/040596", dated Oct. 6, 2016, 24 Pages.
"Second Written Opinion Issued in PCT Application No. PCT/US2016/040596", dated May 18, 2017, 17 Pages.
"International Preliminary Report on Patentability Issued in PCT Application No. PCT/US2016/040598", dated Jul. 13, 2017, 7 Pages.
"International Search Report and Written Opinion Issued in PCT Application No. PCT/US2016/040598", dated Oct. 28, 2016, 18 Pages.
"Touch and Input Sensing for Wearable Devices", Retrieved From: http://ww1.microchip.com/downloads/en/DeviceDoc/00001693B.pdf, 2015, 2 Pages.
"Touch and Share Smart Phones", Retrieved From: https://timesofindia.indiatimes.com/city/chandigarh/Touch-and-share-smart-phones/articleshow/25401132.cms, Nov. 8, 2013, 4 Pages.
"Non Final Office Action Issued in U.S. Appl. No. 14/956,289", dated Mar. 19, 2018, 25 Pages.
"Final Office Action Issued in U.S. Appl. No. 14/962,895", dated Jun. 19, 2017, 24 Pages.
"Non Final Office Action Issued in U.S. Appl. No. 14/962,895", dated Mar. 10, 2017, 18 Pages.
"Non-Final Office Action Issued in U.S. Appl. No. 14/962,895", dated Feb. 7, 2018, 25 Pages.
"Final Office Action Issued in U.S. Appl. No. 14/963,102", dated Nov. 17, 2017, 21 Pages.
"Non-Final Office Action Issued in U.S. Appl. No. 14/963,102", dated Apr. 7, 2017, 20 Pages.
"Final Office Action Issued in U.S. Appl. No. 15/376,436", dated Oct. 26, 2017, 21 Pages.
"Non Final Office Action Issued in U.S. Appl. No. 15/376,436", dated Apr. 10, 2017, 20 Pages.
Grover III, Francis X., "inTouch Tech Allows Files to Be Transferred Between Devices With a Touch", Retrieved From: https://newatlas.com/intouch-ring-data-transfer/29486/, Nov. 19, 2013, 3 Pages.
Houben, et al., "WatchConnect: A Toolkit for Prototyping Smartwatch-Centric Cross-Device Applications", In Proceedings of the Conference on Human Factors in Computing Systems, Apr. 18, 2015, 10 Pages.
Klinker, et al., "Using a Color Reflection Model to Separate Highlights From Object Color", In Proceedings of IEEE International Conference on Computer Vision, vol. 87, Jun. 1987, 11 Pages.
"International Preliminary Report on Patentability Issued in PCT Application No. PCT/US2013/060233", dated Mar. 13, 2015, 6 Pages.
Ransiri, et al., "SmartFinger: Connecting Devices, Objects and People Seamlessly", In Proceedings of the 25th Australian Conference on Human-Computer Interaction, Nov. 25, 2013, 5 Pages.
Xu, et al., "Finger-Winiting With Smartwatch: A Case for Finger and Hand Gesture Recognition Using Smartwatch", In Proceedings of the 16th International Workshop on Mobile Computing Systems and Applications, Feb. 12, 2015, 6 Pages.
"Non Final Office Action Issued in U.S. Appl. No. 14/962,895", dated Dec. 7, 2018, 16 Pages.
"Final Office Action Issued in U.S. Appl. No. 14/963,102", dated Jan. 2, 2019, 27 Pages.

* cited by examiner

WEARABLE SENSOR FOR TRACKING ARTICULATED BODY-PARTS

BACKGROUND

Existing wearable sensors for mobile tracking of articulated body parts include body suits, gloves, head mounted sensors and shoulder mounted sensors. Often these are cumbersome and interfere with the wearer's everyday interaction with physical objects. For example, wearing gloves decreases the tactile sensation and dexterity of the fingers and wearing a body suit may be restrictive and/or uncomfortable.

Output from such wearable sensors is often limited in terms of the fidelity of tracking of articulated body parts it enables. For example, the number of degrees of freedom of an articulated body part which may be tracked is typically less than that required to enable fine gestures of the wearer to be detected accurately. Robustness and accuracy of such wearable sensors is also typically restricted due to the need for limitations in size, weight, form factor, the need to operate in real time and the need for low power consumption.

The embodiments described below are not limited to implementations which solve any or all of the disadvantages of known wearable sensors for tracking of articulated body parts.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A wearable sensor for tracking articulated body parts is described such as a wrist-worn device which enables 3D tracking of fingers and optionally also the arm and hand without the need to wear a glove or markers on the hand. In an embodiment a camera captures images of an articulated part of a body of a wearer of the device and an articulated model of the body part is tracked in real time to enable gesture-based control of a separate computing device such as a smart phone, laptop computer or other computing device. In examples the device has a structured illumination source and a diffuse illumination source for illuminating the articulated body part. In some examples an inertial measurement unit is also included in the sensor to enable tracking of the arm and hand Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a wrist-worn sensor device for tracking 3D hand pose, the device described is provided as an example and not a limitation. As those skilled in the art will appreciate, the present examples are suitable for application in a variety of different types of wearable sensors for tracking articulated body parts.

Figure 1:
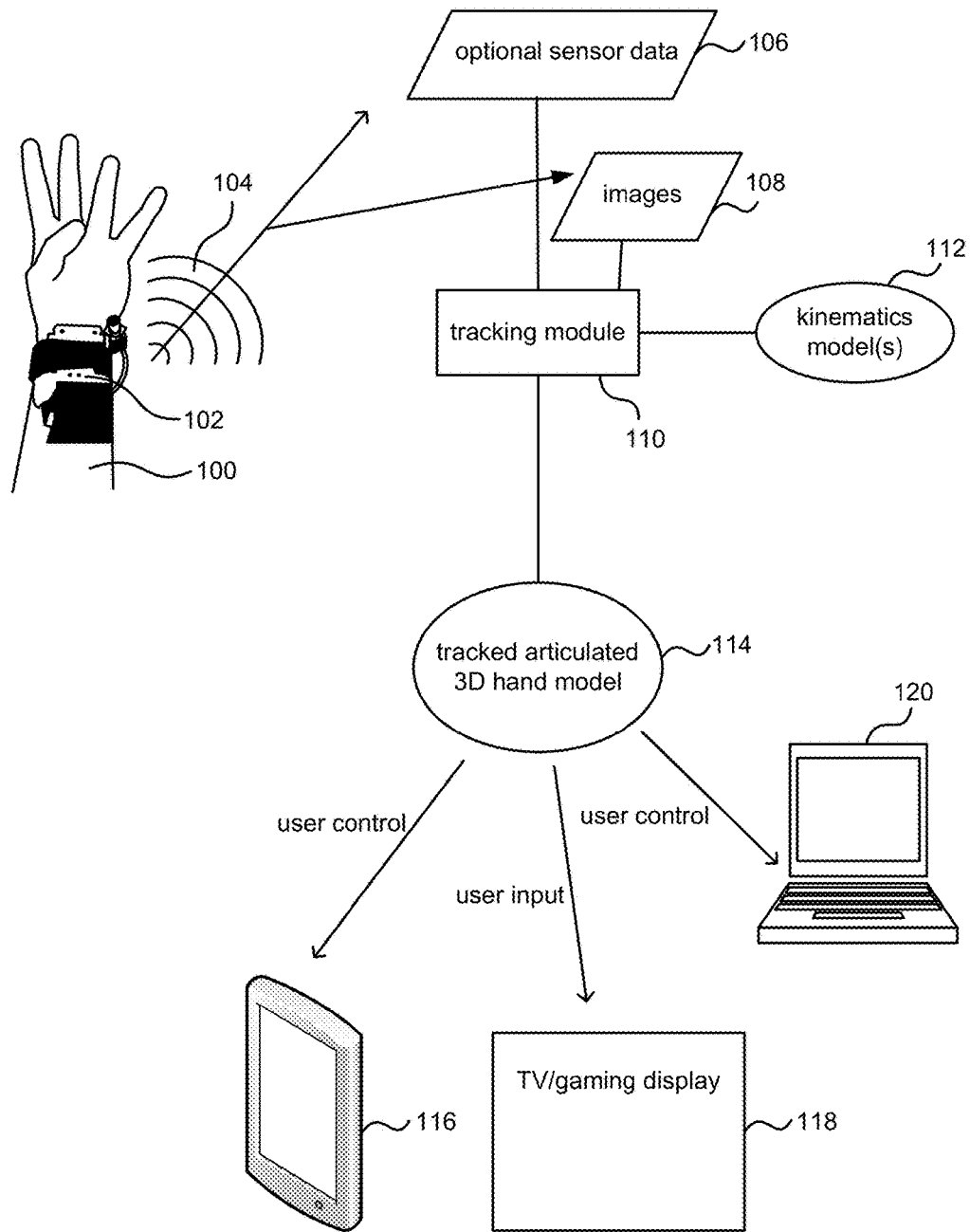
FIG. 1 is a schematic diagram of a wrist-worn sensor used for 3D tracking of hand gestures on the move.

FIG. 1 shows a wearable sensor 102 worn on a user's wrist or forearm 100. The sensor observes data which is used to track 3D pose of the user's hand and optionally also the user's wrist and arm. Using the sensed data an articulated model of the hand is tracked in 3D and according to the types of sensors used an articulated model with greater or fewer degrees of freedom is tracked. The wearable sensor 102 may be worn on other parts of the body, on a belt, or in other ways in order to track other articulated parts of the body. The wearer may be a human or animal. For example, the wearable sensor 102 may be mounted on a shoulder of a person and arranged to track a user's arm, wrist and hand.

In some examples, the wearable sensor 102 sends the data it observes (such as images 108 and optional sensor data 106) to a computing device such as a mobile phone, personal computer, laptop, personal digital assistant, game device, virtual reality system, television or other computing device. The computing device may be separate from the wearable sensor or in some cases may be integrated with the wearable sensor. A tracking module 110 uses images 108 optional sensor data 106 and one or more kinematics models 112 and produces a tracked articulated model 114 of the hand (or other articulated body part) in 3D. The term "kinematics" is explained below. This tracked articulated model 114 may then be used to control one or more computing devices including but not limited to smart phone 116, television/ gaming display 118, laptop computer 120. In some examples the wearable sensor 102 incorporates the tracking module 110 to calculate the tracked articulated model of the body part. It is also possible for the tracking module functionality to be shared between the wearable sensor 102 and one or more separate computing devices. That is, the wearable sensor 102 may comprise a computing device for carrying out only part of the tracking module functionality. Communication between the wearable sensor 102 and one or more computing devices 116, 120 may be achieved using a wireless communications link 104, a wired connection or in other ways.

The wearable sensor enables finger tracking of bare hands (that is the user does not need to wear markers or sensing gloves on his or her hands) with low computational overhead. The user is not bound to a particular external infrastructure and does not interfere with everyday interaction with physical objects. Using the laser line projector together with the diffuse illumination enables low computational overhead. Also, where an IMU is used, the system is able to track 3D pose of the whole arm and digits.

The wearable sensor enables a variety of freehand interactions on the move. For example, a user may interact with a television at home or a large public display from a distance using the wearable sensor. The user may perform a variety of continuous or discrete hand gestures (such as those illustrated in FIG. 2) to support spatial navigation, pointing or selection in 3D. In another example a user is able to hold and interact with a tablet computer or phone with his or her dominant hand whilst using his or her non-dominant hand to provide 3D input to the tablet or phone using the wearable sensor. For example, semantic zooming may be initiated with an in-air pinch gesture and a zoom factor may be controlled with the remaining digits. In another example, on-screen interactions and simultaneous freehand interactions may be supported.

In some examples eyes-free interaction is achieved whereby spatial interactions with invisible user interfaces such as dials, sliders or buttons are enabled without visual output. For example, a user may set the volume on a mobile phone by directly reaching out and interacting with a virtual dial; turning their hand to the right of the body and performing typing gestures on a virtual number pad to place a call; or moving the hand to the left of the body and touching their thumb and individual fingers to activate other phone functions. The type of action may be detected by the initial 3D shape of the hand. For example, if the user requires to change the volume, they simply configure their hand as if they are holding a virtual dial, which can then be rotated to set the desired level.

In some examples the wearable sensor may be used as a 3D scanner to reconstruct a scene or object or to recognize objects from their contours. This may be achieved where the user illuminates an object with the laser line projector. For example, the object may be in his or her hand or on a surface close to the user's hand. Images of the object illuminated with the laser line projector are captured by the camera. These images may be analysed to determine a contour of the object and to recognize that object from its contour. The user may fully outstretch his or her fingers and allow the laser line to project onto the environment. A 3D model of a surface may be generated from the deformed laser line projections which may be correctly spatially aligned using the relative motion and orientation data coming from a wrist-worn IMU.

Figure 2:
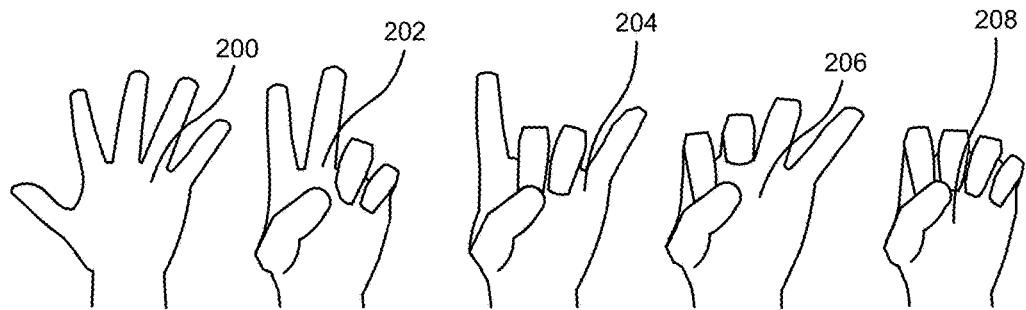
FIG. 2 shows a plurality of hand gestures detectable using a wrist-worn sensor.

FIG. 2 shows examples of hand poses 200, 202, 204, 206, 208 which may be detected using data observed by the wearable sensor in embodiments where the articulated model of the hand comprises, for each finger, at least one joint angle which is calculated from the sensor data independently of two other joint angles of that digit.

Figure 3:
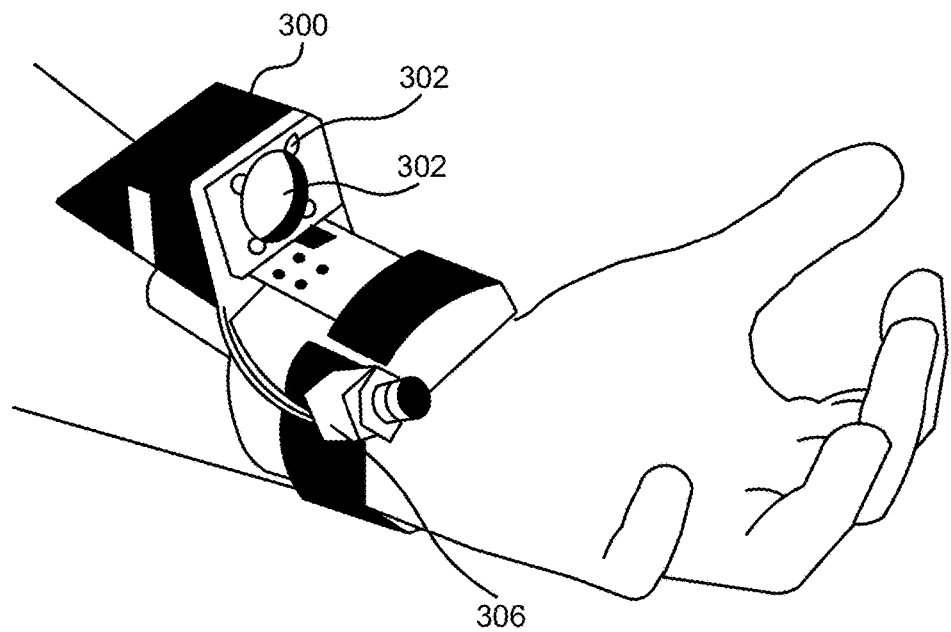
FIG. 3 is a perspective view of a sensor worn on the wrist of a user.

FIG. 3 is a perspective view of a wearable sensor worn on the wrist of a user. In this example the wearable sensor comprises an infra-red (IR) camera 304, an inertial measurement unit (IMU) 300, four IR light emitting diodes (LEDs) 302 and an IR laser line projector 306. The IMU is optional and is used when it is required to track the wrist and arm position in addition to the hand pose. The camera-based sensor may be attached to the inner (anterior) side of a user's wrist in order to optically image a large part of the user's bare hand. The camera may be placed so that the upper part of the palm and fingers are imaged as they bend inwards towards the device. The use of IR allows the illumination to be invisible to the user and offers a level of robustness to ambient visible light. The laser line projector and the LEDs are low cost, readily procurable and low-power components.

In some examples the LEDs may be omitted or the LED data ignored. The IR laser line projector projects a thin IR line across the user's hand which intersects with the fingers and thumb as they bend inwards. That is, the laser projector projects a known pattern of light which in this example is a line but could be another pattern. In these examples the IR laser line projector and camera are used to robustly sample a single 3D point on each of the fingers and thumb. From these five sparse samples, and by exploiting biomechanical constraints of the hand, a fully articulated hand skeleton model is tracked. In this situation a variety of 3D hand poses may be detected such as those illustrated in FIG. 2. Here, the articulated model of the hand comprises, for each digit, a first joint angle which is calculated from the sensor data independently of two other joint angles of that digit; the other two joint angles are inferred by assuming that they have a fixed, known relationship to the first joint angle.

In some examples the LEDs are used to illuminate the user's hand and to obtain a 2D digit tip location for each digit. The 2D digit tip locations may be used together with the samples from the laser line projector to track an articulated model of the hand which has more degrees of freedom and which is therefore able to detect a greater range of gestures. In this case the articulated model of the hand comprises, for each digit, at least two joint angles which are calculated from the observed data independently of one another.

In other examples a time-of-flight camera, a stereo camera or other depth camera is used and the laser line projector and the LEDs are not required. In this case the articulated model of the hand comprises, for each digit, at least two joint angles which are calculated from the observed data independently.

Figure 4:
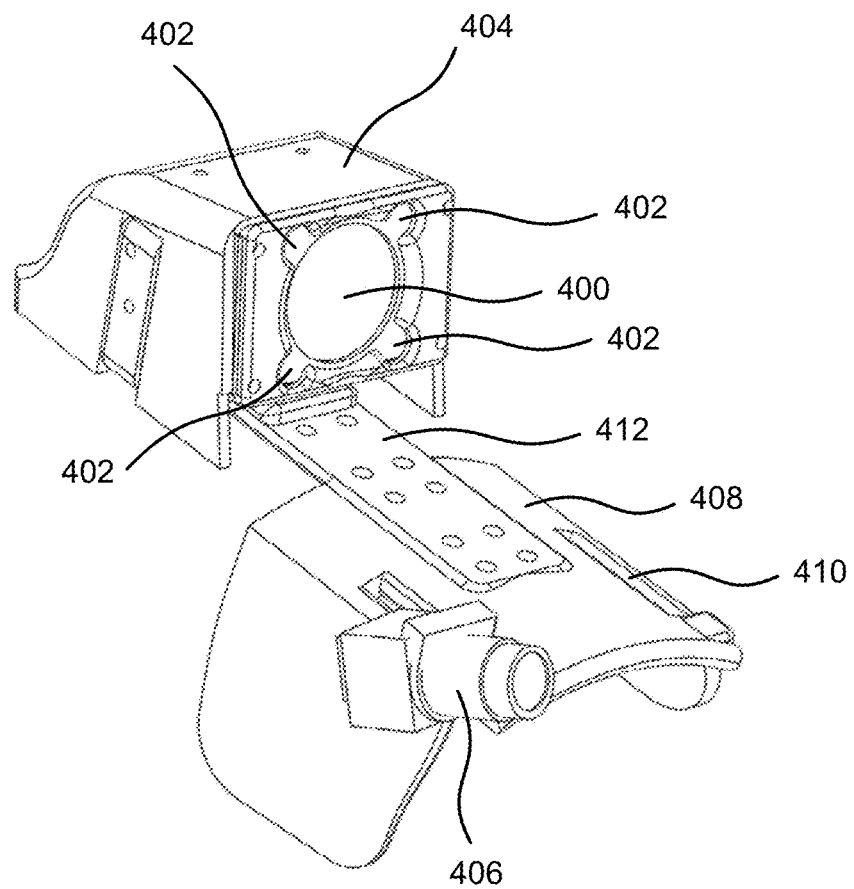
FIG. 4 is a perspective view of a sensor suitable for wearing on the wrist.

FIG. 4 is a perspective view of an example wearable sensor comprising an IR camera 400 attached to one end of a support arm arranged to lie on the inner forearm of a user.

The support arm is connected to a bridge portion 408 at its other end. The bridge portion 408 is sized and shaped to be worn on the anterior (inner) wrist of the user and has a pair of slots 410 through which a fixing strap may be threaded to enable the wearable sensor to be fastened to a user's wrist in use (as shown in FIG. 3). An IR laser line projector 406 is attached to the bridge portion 408 at an angle so that it projects a laser line towards fingers of the user during operation. Four diffuse IR LEDs 402 are attached around the camera 400. (Other numbers and arrangements of IR LEDs may be used where these illuminate the digits of the user with diffuse illumination.) The laser line projector 406 and the LEDs 402 may be controlled so that during a first frame captured by the camera all active illumination is turned off so that the frame captures ambient IR. During a second frame captured by the camera only the laser line projector is on and during a third frame captured by the camera only the LEDs are on. Other ways of controlling the illumination and camera frame capture may also be used. An IMU may be attached to a housing 404 around the camera and provides absolute tri-axis orientation data of the forearm. The wearable sensor may be lighter than a standard watch with a metal wristband.

Figure 5:
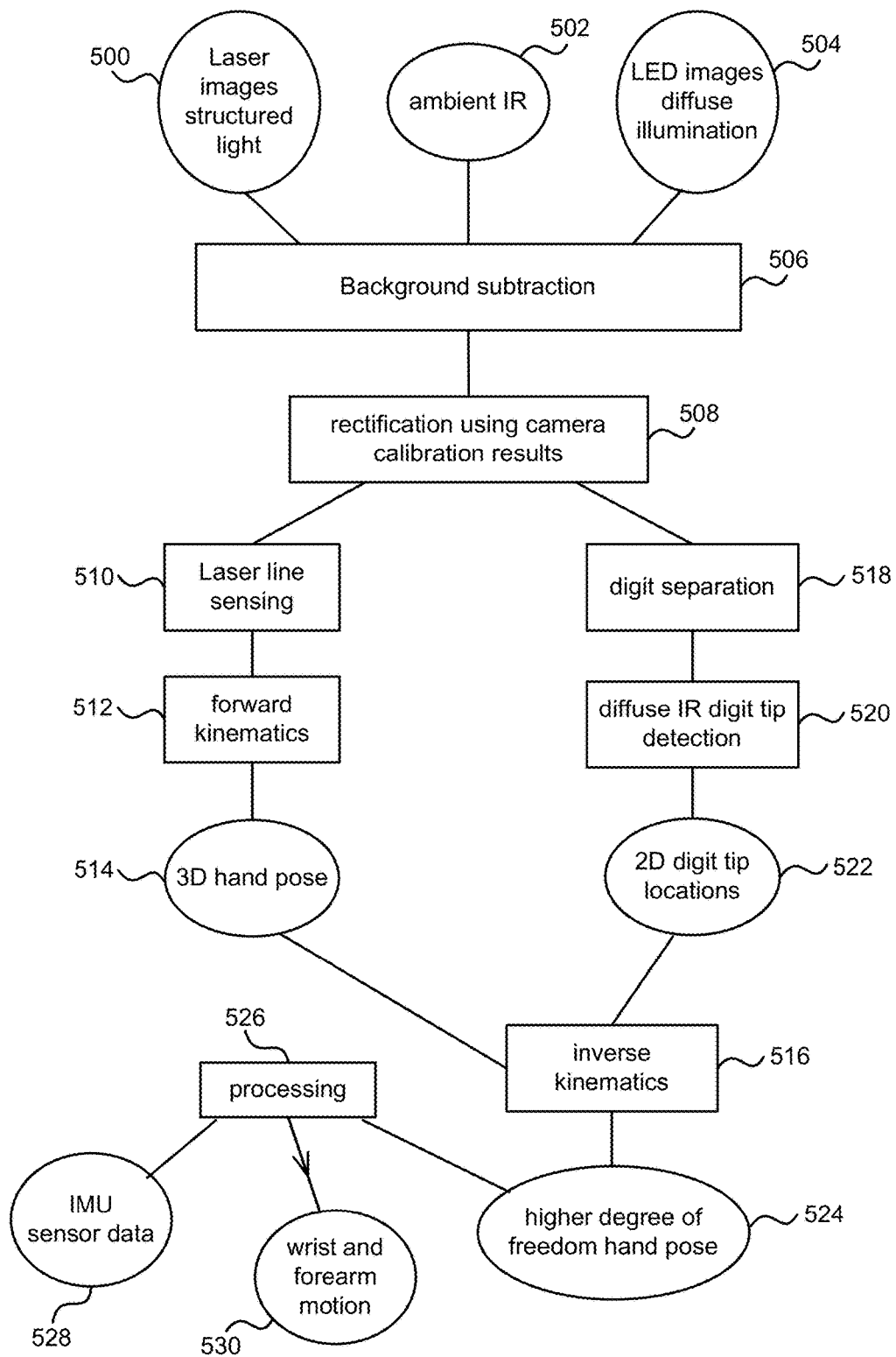
FIG. 5 is a flow diagram of a method of tracking hand pose using images of the hand obtained in both diffuse illumination and in structured illumination.

More detail about the tracking module 110 of FIG. 1 is now given with reference to FIG. 5. Input to the tracking module 110 may comprise laser images 500 comprising structured light, ambient IR images 502 and LED images 504 comprising diffuse illumination. A background subtraction stage 506 subtracts the ambient IR image 502 from each of the laser image 500 and the LED image 504. This reduces interference from ambient IR in the environment such as from room lights or sunlight. A rectification stage 508 rectifies the laser image 500 and the LED image 504 using camera calibration results obtained from a camera calibration step which is described later in this document.

An example process for obtaining 3D hand pose 514 from the laser image 500 comprises a laser line sensing process 510 and a forward kinematics process 512. The results from a digit separation process 518 are also used here. A kinematic chain is a sequence of joint parameters that model motion of an articulated entity such as a robot, animated character, person, animal or part of an articulated entity. A kinematic chain typically has an end effector which is the element at the extremity of the articulated entity being represented. For example, a fingertip at the end of a finger, a hand at the end of an arm, a grip at the end of a robot arm. An inverse kinematic process may be a calculation for finding the joint parameters given a required or known motion of the articulated entity. A forward kinematic process may be a calculation for finding the motion of the articulated entity given the joint parameters. A kinematics model is a representation of an articulated entity as a plurality of parts connected by at least one joint. For example, a hand may be modeled using one kinematic chain per digit so that a finger may be represented as a plurality of bones connected in series by a plurality of joints; each joint may be considered as having a joint angle so that the finger representation comprises a chain of joint angles as the bones are connected in series. Chains of joint angles may also occur in other models of articulated entities.

In some examples, where the LEDs are omitted or not used, the tracking module 110 of FIG. 1 comprises only the background subtraction stage 506, rectification 508, laser line sensing 510, digit separation 518 and forward kinematics 512 of FIG. 5. In examples where the LEDs are used together with the laser line projector to obtain a higher degree of freedom hand pose 524 then the tracking module 110 of FIG. 1 also comprises diffuse IR digit detection 520, and inverse kinematics process 516. In examples where an IMU is used IMU sensor data 528 is processed 526 to obtain wrist and forearm motion 530.

In examples where a time-of-flight camera, stereo camera or other depth camera is used the background subtraction step 506 may be omitted together with the laser line sensing 510 and the forward kinematics 512.

Figure 6:
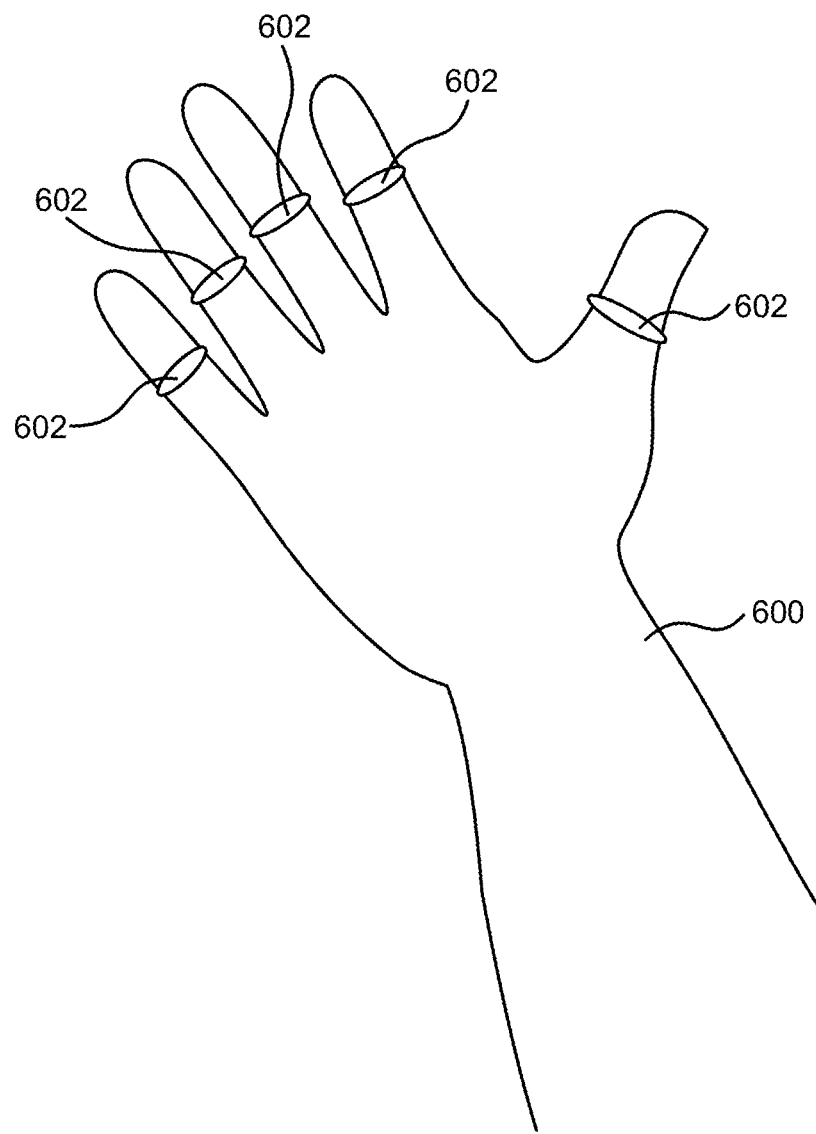
FIG. 6 is a schematic diagram of a hand illuminated with a laser line projector.
Figure 7:
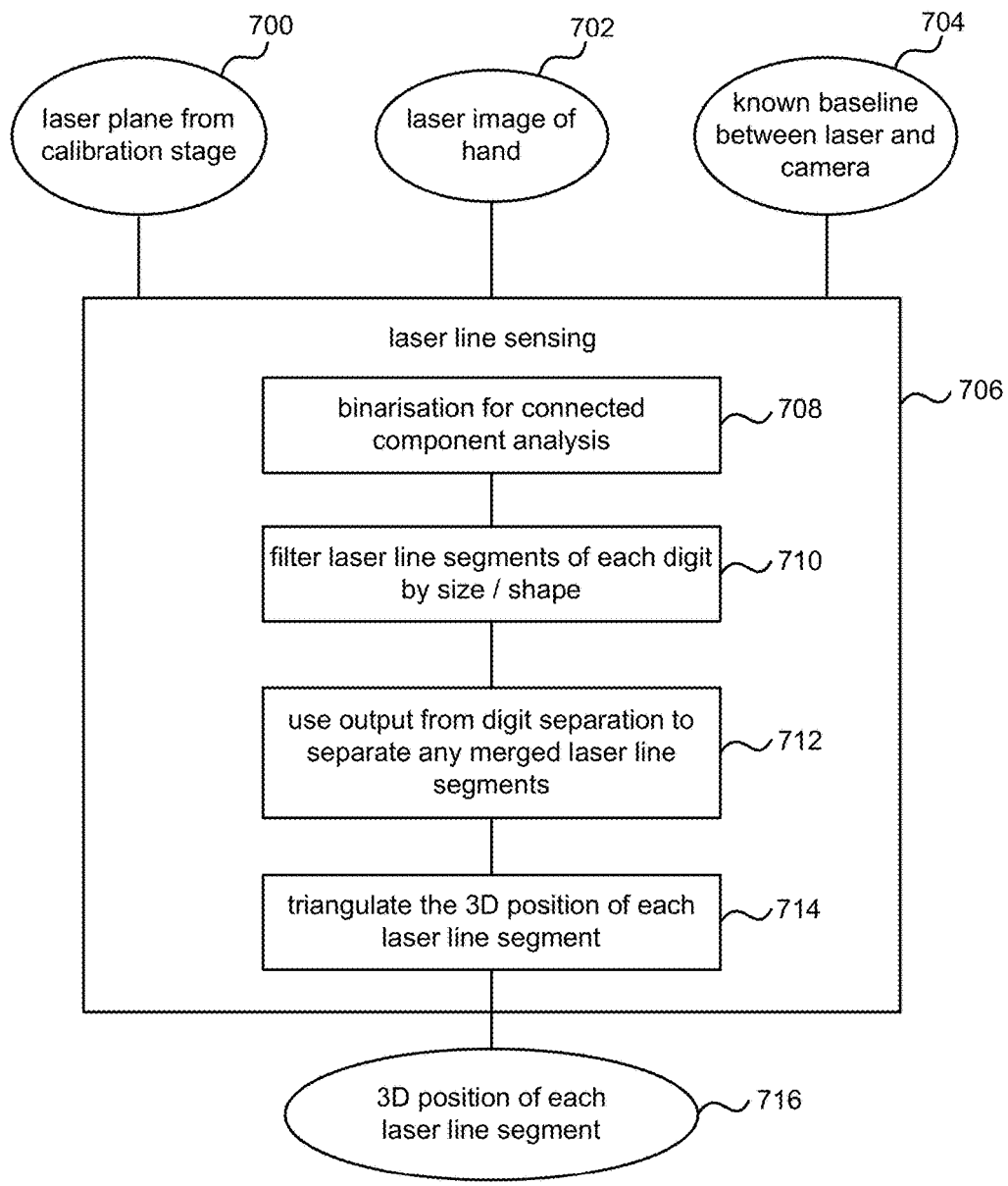
FIG. 7 is a flow diagram of a method at a laser line sensing module.

More detail about an example laser line sensing process is now given with reference to FIGS. 6 and 7. As mentioned above an IR laser line projector projects a thin IR line across the user's hand which intersects with the fingers and thumb as they bend inwards. FIG. 6 is a schematic diagram of the user's hand 600 showing laser line segments 602 as ellipsoids or blobs one on each digit where the IR line intersects with that digit by shining on it. The wearable sensor is not shown in FIG. 6 for clarity. The intersections appear as bright regions in the 2D IR image and move towards the palm as the digits are bent and in the opposite direction when the digits are straightened. With a fixed known baseline and orientation between the laser line projector and the camera it is possible to triangulate the exact 3D position of each laser line segment. The baseline and orientation are implicit in the calibrated laser plane.

Figure 9:
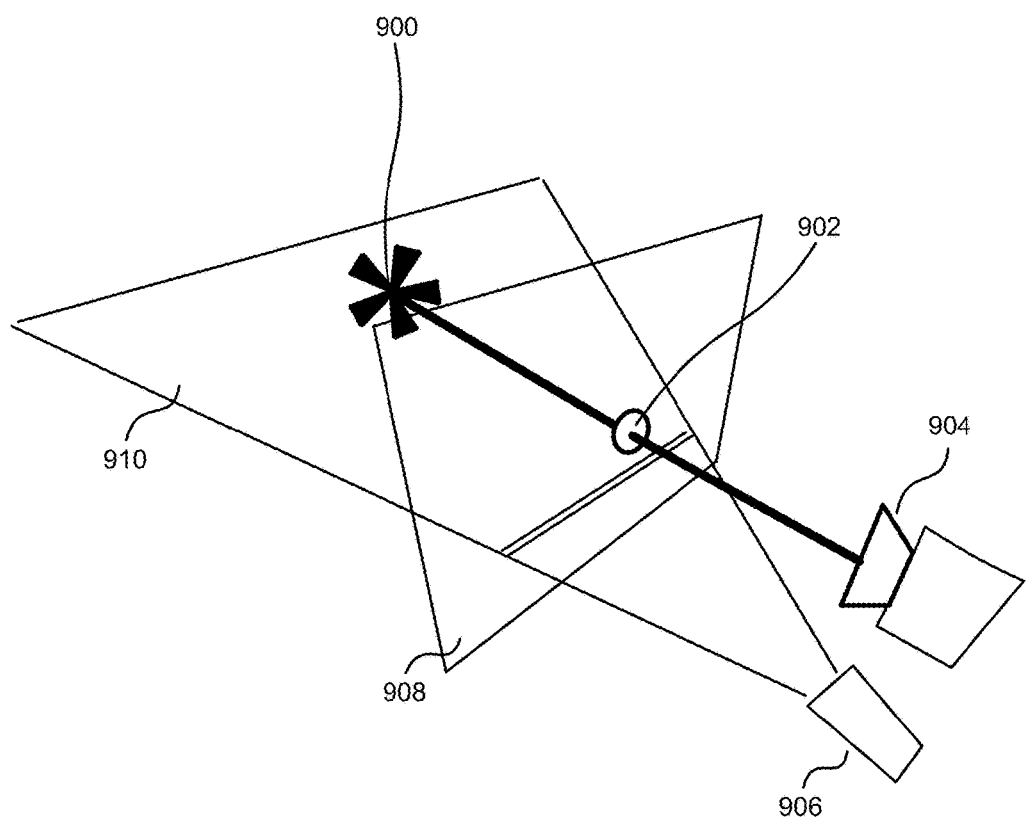
FIG. 9 is a schematic diagram of a reprojected ray intersecting with a laser plane.

With reference to FIG. 7 a laser line sensing process or module 706 receives as input a laser plane 700 relative to the camera from a calibration stage, a laser image 702 and a known baseline 704 length between the laser line projector and the camera. The laser image 702 has been background subtracted and rectified as described above with reference to FIG. 5. The laser line sensing process carries out binarisation 708 of the laser image 702 whereby each image element of the laser image is set to 1 of two possible values according to its intensity (for example using a thresholding process). The binarized image undergoes connected component labeling 708 that groups binarized image elements into groups of image elements with unique identifiers. The resulting image is filtered 710 according to size and shape to segment the laser line segments (602 of FIG. 6). An image element may be a pixel or a group or patch of pixels, and in the case of higher dimensional images the image element may be a voxel, group of voxels or other region of a 3 or higher dimensional image. The results of a digit separation process (described later in this document) are used to separate 712 any merged laser line segments, for example where two fingers are close together. The 3D position 716 of each laser line segment is then obtained by triangulation 714. The triangulation may comprise reprojecting the centroid of each laser line segment using intrinsic parameters of the camera (which are obtained from a calibration step). From the camera 904 center a ray through the centroid 902 in the image plane 908 is intersected with the laser plane 910 (received as input from a calibration process) as illustrated in FIG. 9. This defines a 3D point for each digit relative to the camera.

Figure 8:
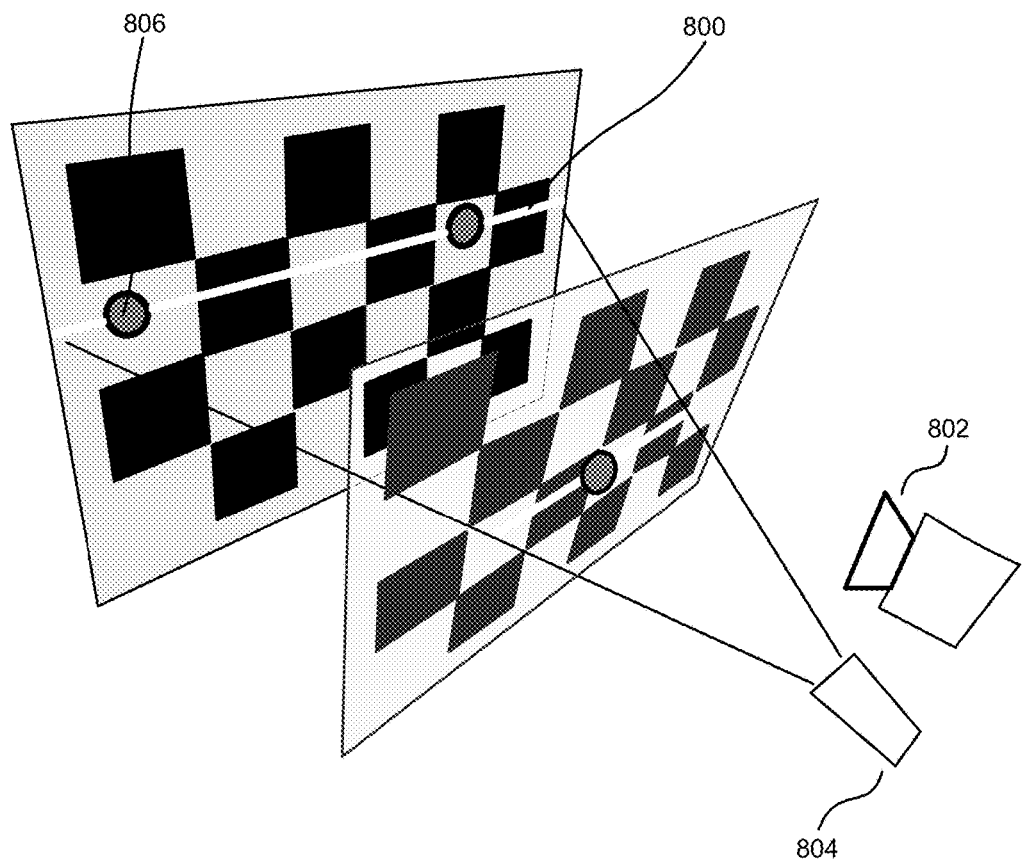
FIG. 8 is a schematic diagram of a laser plane calibration set up.

An example calibration process is now described. This may be a one-off calibration process for the camera and laser line projector. The camera's intrinsic parameters may be obtained using a checkerboard calibration method of any suitable type. These intrinsic camera parameters may be used for image rectification. The user positions the same checkerboard used for the camera 802 calibration so as to intersect it with a line projected from the laser line projector 804 as illustrated in FIG. 8. A 6 degree of freedom extrinsic pose of the checkerboard is computed relative to the camera center using any suitable technique. The user selects an intersection point 806 and the associated 3D point is recorded. The process is repeated until three non-colinear points are selected to define the laser plane relative to the camera.

Figure 10:
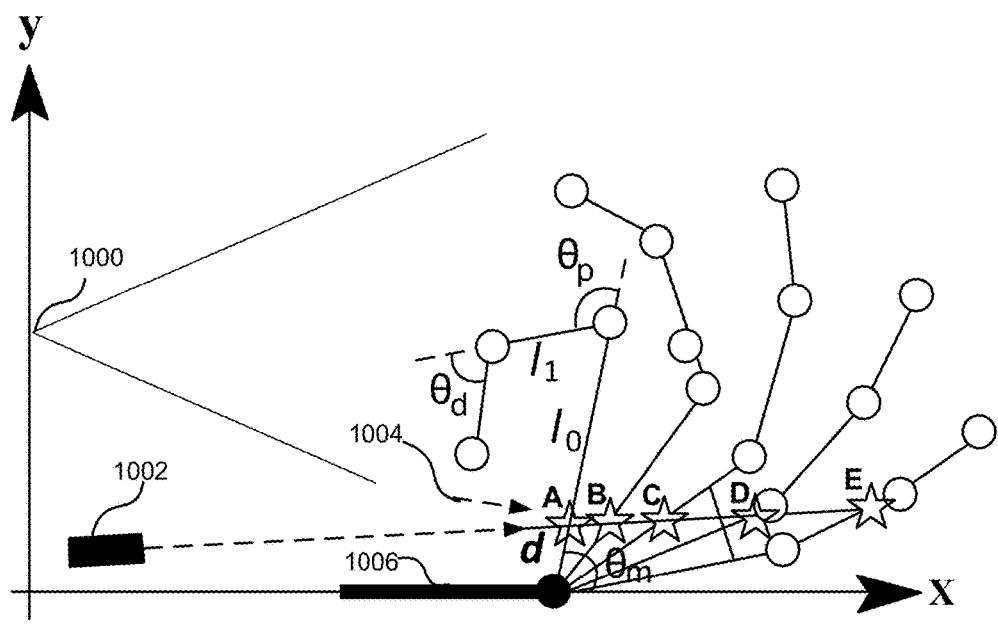
FIG. 10 shows an example of a kinematic model of a digit and a graph mapping between laser distance and proximal interphalangeal joint angle.
Figure 10:
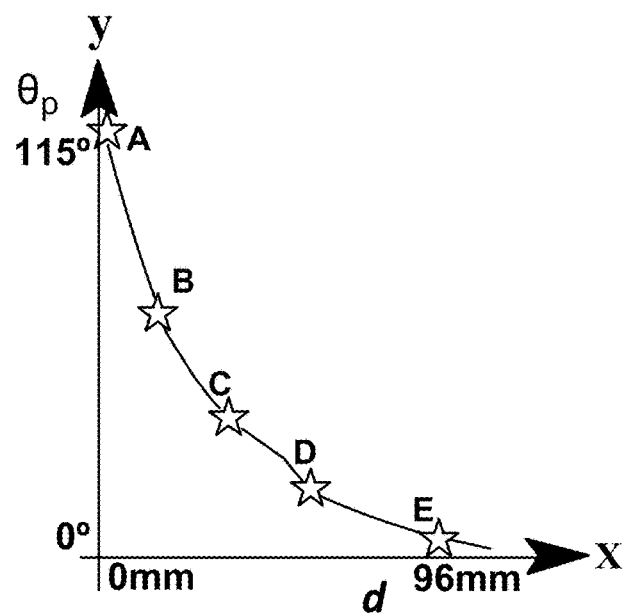

Given the 3D positions of each laser line segment a forward kinematics process 512 may be used to obtain a 3D hand pose. An articulated model (also referred to as a kinematic model) of a hand may comprise, for each digit, three bone lengths and one joint angle. A forward kinematic process 512 is used to calculate the one joint angle from the observed laser image. An example articulated model of a single finger is shown in FIG. 10 which represents the main bones in a finger as lines and the main joints of a finger as circles. A finger is represented as comprising three bones, namely proximal, middle and distal phalanges. From fingertip to palm these bones are interconnected by a 1 degree of freedom revolute joint called the distal interphalangeal (DIP) joint, a 1 degree of freedom revolute proximal interphalangeal (PIP) joint and a two degree of freedom spherical joint called the metacarpophalangeal (MCP) joint. The articulated model is arranged so that both the MCP (represented by symbol $\theta_m$ in FIG. 10) and DIP ($\theta_d$) angles may be derived if the PIP angle ($\theta_p$) is known. Due to the proportionality of the joint angles, two other joint angles may be derived from any of the joint angles. That is, the other two joint angles may be determined in dependence on the first joint angle. As illustrated in FIG. 10 a joint angle is the angle between a line projecting longitudinally along a first bone entering the joint from the palm end towards the digit tip, and a second bone leaving the joint. The ratio between PIP and DIP angles is 1/0.84 and the ratio between PIP and MCP angles is 1/0.54. (Other ratios may be automatically or experimentally obtained for each user and digit.) Using these ratios the model enables a common finger motion to be approximated when an outstretched finger curls inwards until it touches the palm (the palm is represented as line 1006), with only a single parameter (the PIP joint angle). In FIG. 10 the camera is at position 1000 and the laser line projector at position 1002. The laser line projector illumination is represented as a dotted line extending from the laser line projector and intersecting the digit at positions A (1004), B, C, D and E according to the position of the finger. FIG. 10 also shows a graph of the PIP angle ($\theta_p$) in degrees against a normalized laser distance (d) in mm. The laser distance is the distance of the laser line segment obtained from the process 510 of FIG. 5. The data for the graph is obtained by simulating the articulated model of the hand; that is by using the model to generate simulated data which is plotted in the graph of FIG. 10. The points A, B, C, D and E on the graph correspond to the points with the same reference labels in the upper part of FIG. 10. The graph may be fitted using a cubic function as follows where d is the distance to the laser line segment intersection:

$$\text{PIP angle} = -0.0003*d^3 + 0.059*d^2 - 4.07*d + 119.75.$$

As fingers have similar anatomy it is reasonable to assume that this function is valid for all fingers. A one-off online calibration process is carried out for each finger. This comprises plotting the principal axis of motion for each finger. New intersections are normalized along this axis. Because normalization is along a 3D line this approach also works for the thumb which moves more diagonally in the sensor image. Articulated thumb motion is found to be tracked workable in practice. In some examples, a separate articulated thumb model is used to increase accuracy of thumb tracking. In some examples lateral motions of the fingers (i.e. allowing fingers to move left and right) is modeled by mapping deviation from the calibrated principal axis to a 3D rotation which is applied to each finger after articulating finger bend.

Figure 12:
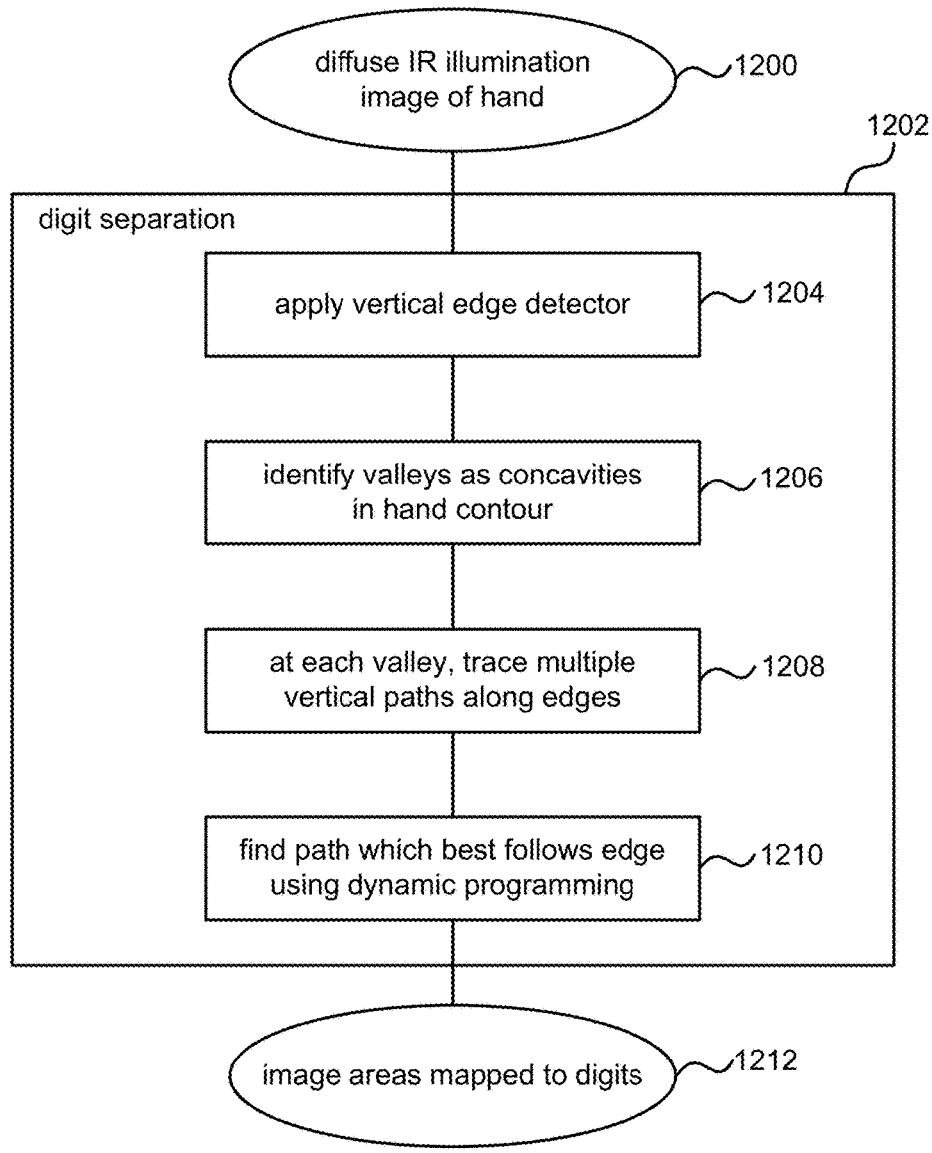
FIG. 12 is a flow diagram of an example method at a digit separation module.

A digit separation 1202 process is now described with reference to FIG. 12. This process associates regions of the LED image 1200 with each of the digits of the hand. The LED image is background subtracted and rectified as mentioned above. The digit separation process 1202 applies 1204 a vertical edge detector to the LED image which produces a hand contour in that the vertical edges which are detected tend to trace a contour of the hand. Any vertical edge detector may be used such as a one dimensional Sobel filter. Valleys are identified 1206 as concavities in the hand contour and, at each valley, multiple vertical paths are traced 1208 along the vertical edges detected previously. Of the multiple vertical paths, a path is selected 1210 which best follows an edge. For example, this is achieved by using dynamic programming to detect the path with the lowest overall energy by penalizing paths not following the edge. The result divides the image into five areas each mapped 1212 to a digit.

Figure 13:
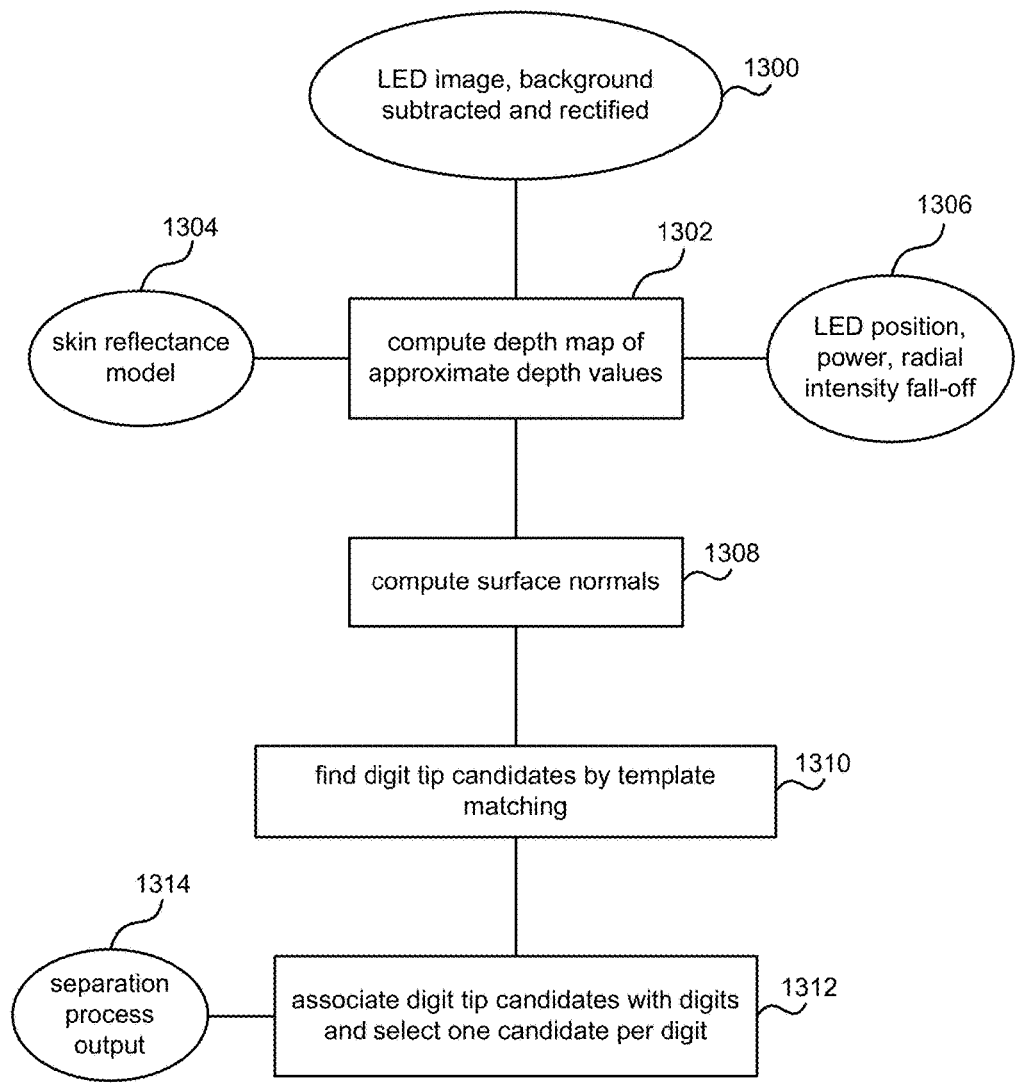
FIG. 13 is a flow diagram of an example method at a digit tip detection module.

An example digit tip detection process is now described with reference to FIG. 13. The process takes as input an LED image 1300 which has been background subtracted and rectified as mentioned above. From the LED image a depth map is computed 1302 of approximate depth values. The depth map comprises an approximate depth value for each image element which represents a depth of a surface depicted by that image element from the camera. In order to compute the depth map a skin reflectance model 1304 may be taken into account as well as information about the position of the LED light sources 1306 with respect to the camera, LED power, and information about radial intensity fall-off of the LED light sources.

In an example, an intensity of an image element of the LED image is used to calculate the approximate depth value for that image element by assuming a relationship between intensity and depth. In addition one or more factors such as the radial intensity fall-off, skin reflectance model, LED position, LED power and others may be taken into account. For example, depth measurements are estimated for each image element under an inverse-square law whereby the intensity of the image element is inversely related to the square of the depth of a surface depicted by the image element from the camera. This depth measurement may then be attenuated according to the radial falloff in light intensity for image element further away from the LED central ray. In summary, a depth value for a given image element u may be calculated as the square root of the intensity I of the image element multiplied by the inverse of, the cosine of the arc tangent of, the ratio of, the difference between the image element position and the principal point pp (intersection of the optical axis and the image plane, i.e. the center of the image), and the focal length fl of the camera. This may also be expressed as:

$$D(u) = \sqrt{I(u)} \frac{1}{\cos\left(\arctan\left(\frac{(u-pp)}{fl}\right)\right)}$$

The principal point (image center) and the focal length may be obtained from the calibration stage.

A surface normal is computed 1308 for each image element from adjacent image elements in the depth map. Regardless of the distance of the finger to the camera the surface normals of the fingertips stay constant whereas the image element intensity changes. This means that by finding the surface normals a template matching process to find digit tip candidates gives good results. Referring to FIG. 13, digit tip candidates are found 1310 by using template matching or in other ways. It is found that digit tips produce distinct peaks in depth which are similar in shape to a Gaussian sphere centered around the digit's most protruding part. A synthetic digit tip template based on a Gaussian sphere may be used to obtain matching scores (calculated as squared distances) from the normal map. This approach is found to work well including when digit tips point towards the camera and including when multiple digit tips touch one another. Other 2D techniques such as peak and valley algorithms or hierarchical connected component analysis tend to have difficulties in those situations.

In other examples a derivative map is calculated from the intensity image rather than computing the surface normals. In a derivative map each image element encodes the direction and strength of a local intensity gradient. The derivative map may then be used for the template matching process to find the digit tip candidates.

The depth map may be processed in any suitable way to produce a quantity which is invariant to the distance of the surfaces depicted in the depth map. Surface normals and a derivative map are only two examples.

The digit tip candidates may be associated 1312 with digits (using image regions found 1314 from the digit separation process). If there is more than one candidate per digit then one is selected (for example, by taking the candidate which is uppermost or in other ways). This gives up to five 2D digit tip regions.

As explained above with reference to FIG. 5 2D digit tip locations 522 from the LED image may be input to an inverse kinematics process 516 together with 3D hand pose 514 obtained from the laser image. By combining data sensed from the diffuse illuminated image (LED image) and the structured light image (laser image) it is possible to obtain a higher degree of freedom hand pose 524 than is possible from the laser image alone. An example in which this is achieved is given below with reference to FIG. 14. Inverse kinematics typically derives joint angles from the 3D position of an end effector, which in the case of a digit is a digit tip. In the example now described no accurate 3D measurement for digit tips is available and the 3D point sampled with the laser is not directly associated with the end effector. Despite this, by combining the two sensing modalities, a higher degree of freedom skeletal model of the articulated body part is tracked. For example, the skeletal model enables separate articulation of the MCP joint.

Figure 14:
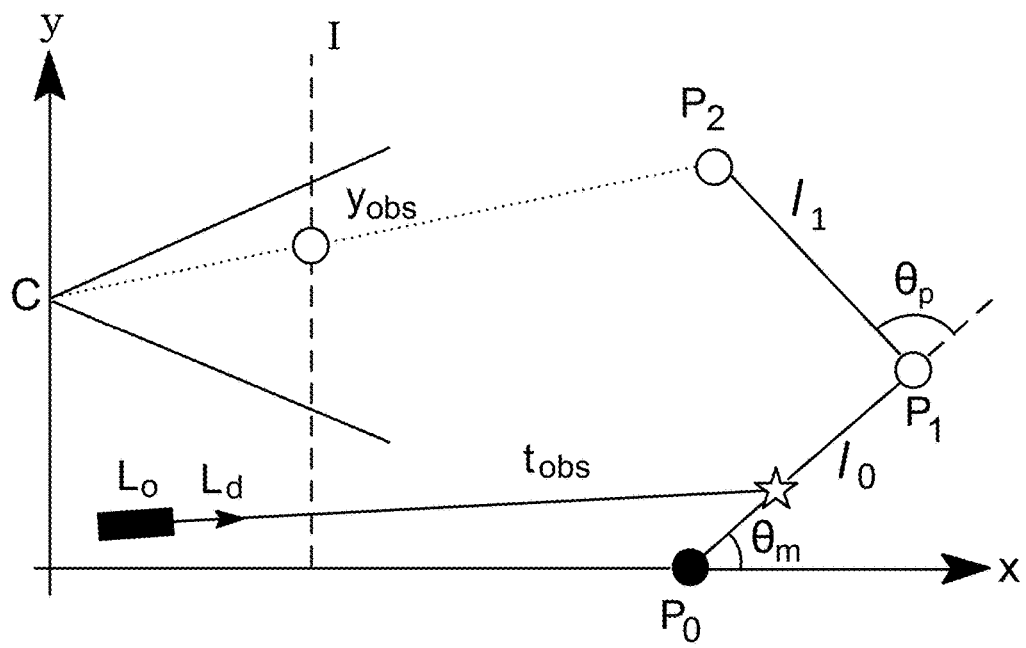
FIG. 14 is a schematic diagram of another kinematic model of a digit.

FIG. 14 is a schematic diagram of a higher degree of freedom articulated model of a hand. FIG. 14 shows the model in 2D for clarity although in practice the articulated model is three dimensional. FIG. 14 shows the model for one digit only (again for clarity) and shows the PIP and DIP joints as combined because these two joints are unable to move independently unless the finger is pressed against a surface. The palm is assumed to be resting directly on the X axis. The position of the MCP joint is given by $P_0$, the position of the PIP joint is $P_1$ and the end effector (digit tip) is at $P_2$. Whilst the 3D location of the end effector is not known, it is possible to observe the projection of the point ($y_{obs}$) on the image plane (I) (as this equates to the centroid of the detected fingertip in the IR image). Given the calibration matrix of the camera, it is possible to project a ray from the camera center C through the image plane I shown as a dotted line in FIG. 14. $P_2$ exists somewhere along that ray. The laser line projector is shown as having an offset from the origin of $L_0$ and a direction $L_d$. The laser line segment (where the laser intersects the digit) is shown as a star at a distance $t_{obs}$ from the laser line projector. The lengths of each of the bones $l_o$, $l_1$ of the digit are known, either by measurement or by assuming predefined values. The MCP angle is to be found using the observed data and is shown as $\theta_m$ and the PIP joint is also to be calculated from the observed data and is shown as $\theta_p$.

Figure 15:
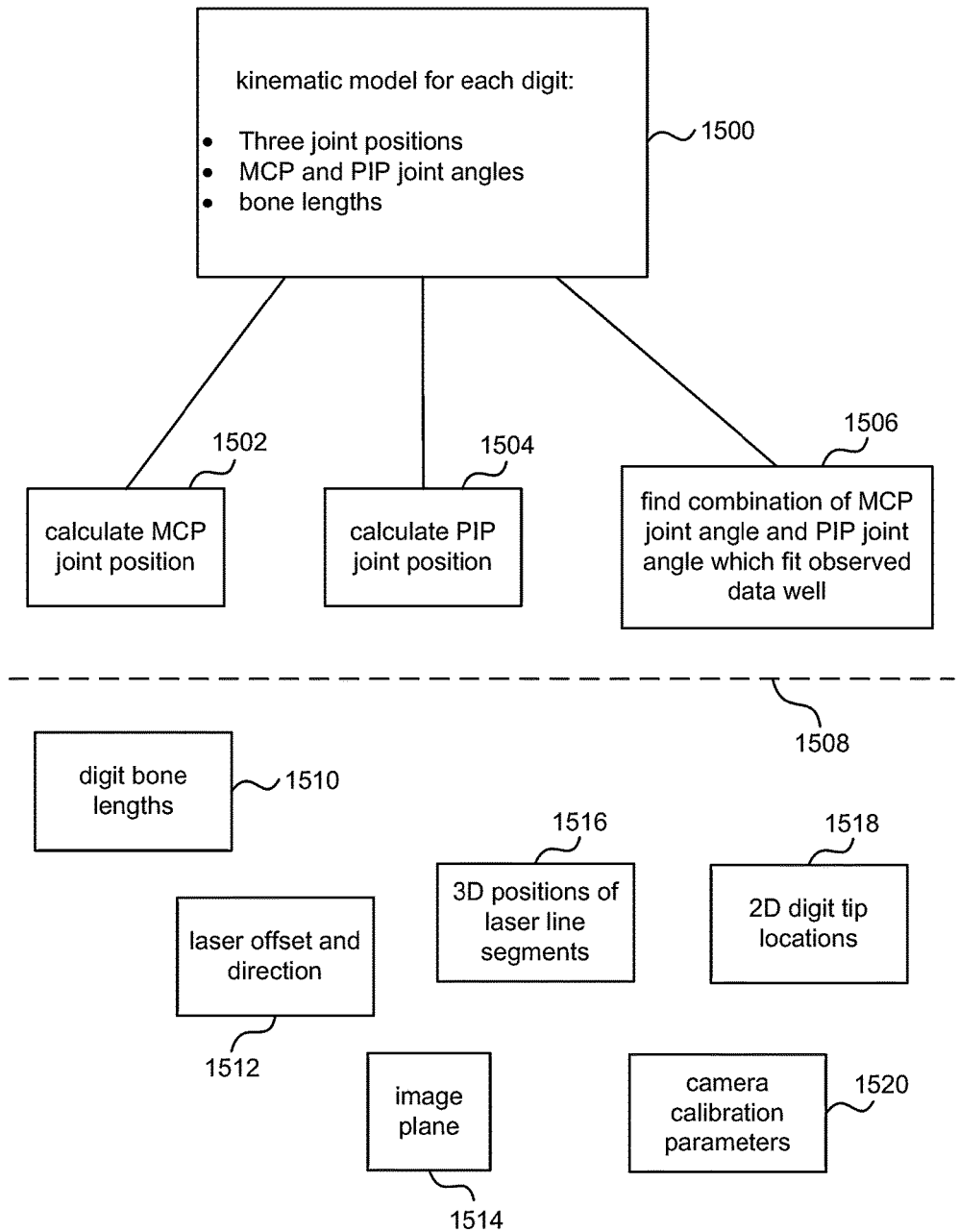
FIG. 15 is a schematic diagram of the kinematic model of FIG. 14, data used to track the kinematic model and processes used to track the kinematic model.

With reference to FIG. 15 the kinematic model 1500 to be tracked comprises, for each digit of the hand, three joint positions, two joint angles (MCP and PIP) and two bone lengths. Data available to a calculation process for tracking the kinematic model is illustrated schematically in FIG. 15 below the dotted line 1508. This information comprises digit bone lengths 1510 (measured or predefined values), an offset of the laser line projector from the origin and a direction of the laser line projector 1512 (known from design of sensor), an image plane 1514 (known from calibration), 3D positions of laser line segments 1516 (from laser line sensing process described above), 2D digit tip locations 1518 (from the digit tip location process described above), and camera calibration parameters 1520 from a calibration process.

To calculate 1502 the MCP joint position ($P_0$) a calculation process may use the laser line data which gives the 3D position of the laser line segment intersecting the digit. The MCP joint position may be regarded as an extension of the wrist and forearm. That is, the MCP joint position may be estimated by extending the wrist position by the length of the metacarpal (palm) bone. That length may be empirically determined or may be specified.

To calculate 1504 the PIP joint position $P_1$ a local transform may be applied to the MCP joint position. The local transform may comprise a translation by bone length $l_0$ and a rotation around the MCP joint by the MCP joint angle $\theta_m$). The MCP joint angle is not yet known but the PIP joint position may be expressed mathematically in terms of the MCP joint angle on the basis of the local transform.

A method to find 1506 a combination of MCP joint angle and PIP joint angle which fit the observed data well may be used. The observed data comprises the location of the 2D digit tip sensed using the LEDs and a 3D point measured with the laser. An energy function $E_{led}$ in the IK model that incorporates the fingertip location observed in the LED images may be defined as follows:

$$E_{led} = |\text{proj}(P_2) - y_{obs}|^2$$

Which may be expressed in words as, the square of the absolute value of the error between the observed LED fingertip location and an IK hypothesis thereof is equal to the square of the distance of a projection of $P_2$ (the digit tip location) onto the image plane using the camera calibration parameters, and the observed projection of the digit tip on the image plane.

This energy function $E_{led}$ generates estimated positions for $P_2$ (the digit tip location) given variations of $\theta_m$ and $\theta_p$, and projects these onto the image plane I (using the intrinsic camera calibration parameters). It has a low error for points that are close to the observed point on the image plane $y_{obs}$.

A second function $E_{las}$ may be defined for use with the laser image data. The function is an error function where it expresses a different and is an energy function where it expresses a square of an absolute value of the error. This error function first calculates intersections between the laser line and each bone in the finger, based on variations of $\theta_m$ and $\theta_p$ and takes the minimum:

$$t = \min\{\text{isect}(\overrightarrow{L_o L_d}, \overrightarrow{P_0 P_1}),$$

$$\text{isect}(\overrightarrow{L_o L_d}, \overrightarrow{P_1 P_2}\}$$

Which may be expressed in words as t is the minimum of two intersections. The first intersection is of a ray (representing the laser beam) starting at the point $L_o$ and going in the direction $L_d$ and a line segment between $P_0$ and $P_1$ (representing one of the digit bones). The second intersection is of a ray starting at the point $L_o$ and going in the direction $L_d$ and a line segment between $P_1$ and $P_2$.

It then minimizes the distance between the observed 3D laser point $L_{obs}$ and this estimated intersection of the laser ray and the digit bone:

$$E_{las} = |tL_d + L_0 - L_{obs}|^2$$

Which may be expressed in words as an the square of an absolute value of an error between the observed laser line interaction and the IK hypothesis thereof is equal to the square of the difference between, the distance from the origin to the estimated intersection of the laser ray and the digit bone, and the observed 3D laser point (obtained from the laser sensing process).

An error function which aggregates the laser and the LED energy functions may be specified as:

$$\text{argmin}_{\theta_m, \theta_p} E = E_{led} \lambda_{led} + E_{las} \lambda_{las}$$

which may be expressed in words as, the combination of the MCP and PIP joint angle values which produces the minimum energy where the energy is calculated as a weighted sum of the energy obtained from the error between the hypothesized fingertip and the fingertip extracted from the light emitting diode image and the energy obtained from the error between the hypothesized laser interaction and the laser interaction extracted from the laser image.

This allows the system to weight the contribution of either the LED or laser based sensing accordingly, using scalars represented using the symbol $\lambda$. The energy function may be evaluated in any suitable manner across a specified range of the MCP and PIP joint angles. The evaluation process finds 1506 a combination of the MCP joint angle and the PIP joint angle which fits the observed data well. Because there are only two parameters (represented by the symbol $\lambda$ above) it is possible to use a brute force search to find the minimum in an efficient manner despite the fact that the energy function would otherwise be extremely difficult to minimize using standard techniques.

In this way the kinematic model 1500 of FIG. 15 may be tracked in real time. Because the kinematic model enables more degrees of freedom of the hand to be tracked a wider range of hand poses are accurately predicted from raw sensor data. The combination of the two sensing modalities—both the laser line and light falloff, enables the system to solve the otherwise ill-posed inverse kinematics problem.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the tracking module (110 of FIG. 1) functionality may be performed by one or more hardware logic components.

Figure 16:
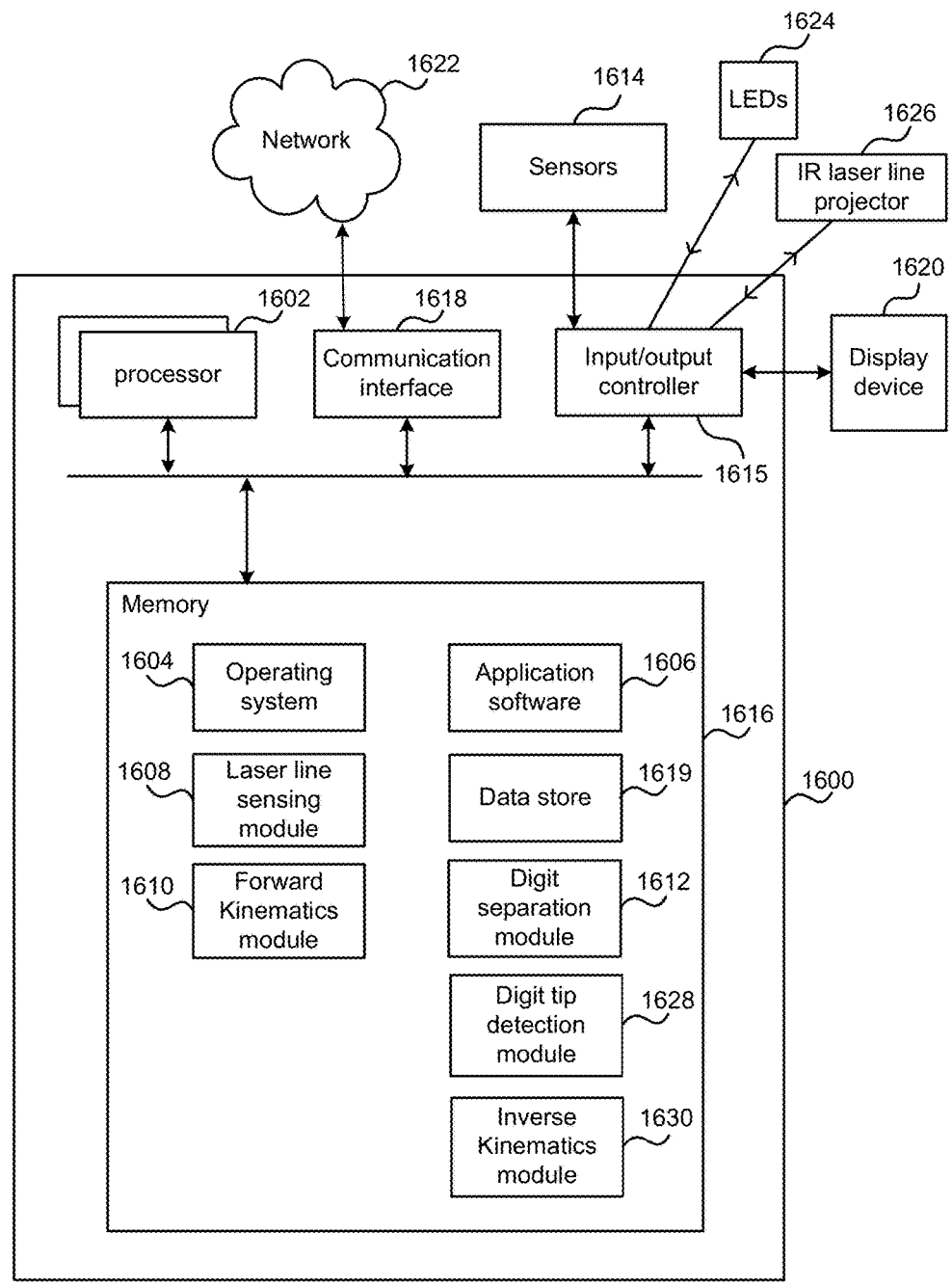
FIG. 16 illustrates an exemplary computing-based device in which embodiments of a wearable sensor for tracking articulated body-parts may be implemented.

FIG. 16 illustrates various components of an exemplary computing-based device 1600 which may be implemented as any form of a computing and/or electronic device, and in which embodiments of a tracker for tracking articulated body parts may be implemented.

Computing-based device 1600 comprises one or more processors 1602 which may be microprocessors, controllers or any other suitable type of processors for processing computer executable instructions to control the operation of the device in order to control one or more sensors, receive sensor data and use the sensor data to track a 3d articulated model of an articulated body part. In some examples, for example where a system on a chip architecture is used, the processors 1602 may include one or more fixed function blocks (also referred to as accelerators) which implement a part of the method of tracking a 3d articulated model of an articulated body part in hardware (rather than software or firmware).

Platform software comprising an operating system 1604 or any other suitable platform software may be provided at the computing-based device to enable application software 1606 to be executed on the device.

Figure 11:
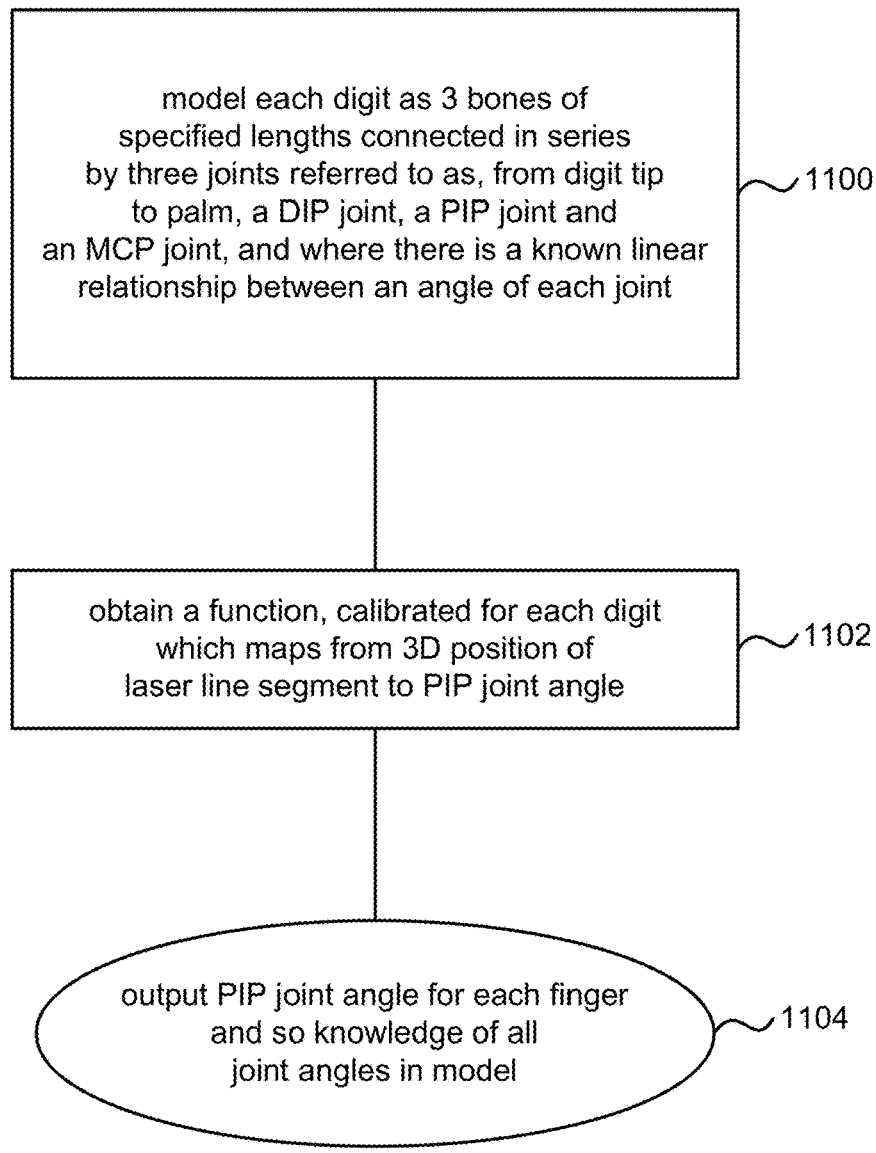
FIG. 11 is a flow diagram of a method of tracking the kinematic model of FIG. 10.

The computing-based device 1600 may also comprise a laser line sensing module 1608 arranged to receive input from one or more of the sensors 1614 and to implement the method of FIG. 7 for example. A forward kinematics module 1610 may be provided to implement the method of FIG. 11 for example. A data store 1619 may store sensor data observed by the sensors 1614, parameter values, kinematic models and other data. A digit separation module 1612 may be provided to implement the method of FIG. 12 for example. A digit tip detection module may be provided to implement the method of FIG. 13 for example. An inverse kinematics module 1630 may be provided to implement the method of FIG. 15.

The computer executable instructions may be provided using any computer-readable media that is accessible by computing based device 1600. Computer-readable media may include, for example, computer storage media such as memory 1616 and communications media. Computer storage media, such as memory 1616, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1616) is shown within the computing-based device 1600 it will be appreciated that the storage may be distributed or located remotely and accessed via a network 1622 or other communication link (e.g. using communication interface 1618).

The computing-based device 1600 may comprise an input/output controller 1615 arranged to output display information to a display device 1620 which may be separate from or integral to the computing-based device 1600. The display information may provide a graphical user interface, for example, to display hand gestures tracked by the device using the sensor input or for other display purposes. The input/output controller 1615 is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment the display device 1620 may also act as the user input device if it is a touch sensitive display device. The input/output controller 1615 may also output data to devices other than the display device, e.g. a locally connected printing device.

The input/output controller 1615 may be in communication with one or more sensors 1614 such as one or more cameras, an inertial measurement unit and/or other sensors. This enables the computing-based device 1600 to receive data observed by the sensors 1614 and to control the sensors 1614. The input/output controller 1615 may also be in communication with one or more light sources 1624 such as light emitting diodes or other diffuse illumination sources and infra-red laser line projector 1626 or other structured illumination sources. This enables the computing-based device to control the light sources.

As explained above with reference to FIG. 1 the sensors 1614 and light sources 1624, 1626 may be integral with the computing-based device 1600 or may be in communication with the computing-based device wirelessly or in other ways.

The input/output controller 1615, display device 1620 and optionally user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A wearable sensing device for gesture-based control of a computing device, the wearable sensing device comprising:
    a camera that captures images of an articulated body part of a user;
    a structured illumination source comprising a laser line projector positioned at a specified distance from the camera to illuminate the articulated body part with a known structured illumination pattern comprising a laser line;
    a tracking module configured to:
        receive the captured images of the articulated body part,
        receive the laser line, a laser image, and a known baseline distance relative to the camera,
        receive a kinematic model of the articulated body part, and
        track the kinematic model of the articulated body part based on the captured images by calculating 3D positions of segments of the laser line of the captured images, including by performing binarization of the laser image, segmenting laser line segments, using a digit separation process to separate any merged laser line segments, and obtaining the 3D position of each laser line segment by triangulation to define a 3D point for each digit relative to the camera; and
    a communication interface that sends the tracked kinematic model of the articulated body part to the computing device to control the computing device in accordance with a gesture associated with the tracked kinematic model of the articulated body part.

2. A device as claimed in claim 1 wherein a bridge portion of the device is sized and shaped to be worn on an anterior side of a wrist of a user to track the kinematic model of the articulated body part, the kinematic model of the articulated body part being a hand of the user associated with the wrist.

3. A device as claimed in claim 1 comprising the structured illumination source positioned on a bridge arm at the specified distance from the camera to illuminate the articulated body part with the known structured illumination pattern.

4. A device as claimed in claim 1 comprising at least one diffuse illumination source to illuminate the articulated body part with diffuse illumination.

5. A device as claimed in claim 1 wherein the articulated body part is a hand and wherein the kinematic model comprises, for each finger of the hand, three bones connected in series by three joints, each joint having a joint angle being an angle between a line projecting longitudinally along a first bone entering the joint from the palm end towards the fingertip, and a second bone leaving the joint, and wherein the articulated model is tracked by determining a first one of the joint angles from at least some of the captured images and determining the other two joint angles in dependence on the first joint angle.

6. A device as claimed in claim 5 wherein the at least some of the captured images are images of the hand illuminated with structured illumination of the known structured illumination pattern.

7. A device as claimed in claim 1 wherein the processor is arranged to track the kinematic model by calculating at least two angles of the kinematic model independently of one another from the captured images.

8. A device as claimed in claim 1 wherein the laser line projector illuminates the articulated body part with a single laser line toward an articulated body part of the user to capture laser images.

9. A device as claimed in claim 1 comprising at least one infra-red light emitting diode to diffusely illuminate the articulated body part.

10. A device as claimed in claim 3, further comprising the bridge arm physically coupled to the user, the bridge arm arranged to lie on an inner forearm of the user, wherein the bridge arm has a pair of slots through which a fixing strap may be threaded to enable the laser line projector and the camera to be fastened to a wrist of the user.

11. A device as claimed in claim 1, wherein the tracking module uses the captured images to track the kinematic model of the articulated body part in real time without a need for markers to be worn on the articulated body part.

12. A method of tracking a 3D articulated model of an articulated body part comprising:
    receiving light emitting diode (LED) images of a hand and associated depth information from a sensing device worn on a wrist associated with the hand, the sensing device comprising a structured illumination source positioned at a specified distance from a camera to illuminate the hand with a known structured illumination pattern comprising a laser line, the associated depth information including a known baseline distance relative to the camera;
    performing background subtraction of the LED images of the hand;
    tracking a kinematic model of the hand based on the received LED images by calculating 3D positions of segments of the laser line of the received LED images, including by performing binarization of the LED images, segmenting laser line segments, using a digit separation process to separate any merged laser line segments, and obtaining the 3D position of each laser line segment by triangulation to define a 3D point for each digit relative to the camera; and
    determining a gesture of the hand based on the tracked kinematic model.

13. A method as claimed in claim 12 comprising calculating a 2D position of an end effector of the hand from the LED images of the hand illuminated with diffuse illumination.

14. A method as claimed in claim 12 comprising computing, for each image element of one of the LED images of the hand illuminated with diffuse illumination, an estimated distance of a surface depicted by that image element from the camera on the basis of intensity of the image element, the diffuse illumination provided by at least one source, each source having identical characteristics; computing from the estimated distances a quantity which is invariant to the distance of the surfaces depicted by the image elements, and carrying out template matching over the quantity.

15. A method as claimed in claim 12 comprising calculating a depth of an unknown location on the hand from the LED images of the hand illuminated with structured illumination from the structured illumination source and using the depth in the process of tracking the kinematic model of the hand.

16. A method as claimed in claim 12 comprising calculating at least two angles by searching possible combinations of values of the two angles which fit data from the received LED images of the hand.

17. A method as claimed in claim 12, further comprising calculating at least two angles in a single chain of angles of the kinematic model of the hand independently of one another from the received LED images and associated depth information.

18. A tracking system for tracking a 3D articulated model of an articulated body part comprising:
   an input/output controller that receives light emitting diode (LED) images and corresponding depth data from a sensing device configured to be worn on a body comprising the articulated body part, the sensing device comprising:
      a camera that captures LED images of the articulated body part, and
      a structured illumination source comprising a laser line projector affixed to a bridge arm positioned at a specified distance from the camera to illuminate the articulated body part with a known structured illumination pattern comprising a laser line;
   a processor arranged to:
      perform background subtraction of the LED images of the articulated body part, and
      receive a kinematic model of the articulated body part; and
   a tracking module configured to:
   receive the laser line, the LED images, and the specified distance from the camera;
   track the kinematic model of the articulated body part by calculating 3D positions of segments of the laser line of the captured images, including by performing binarization of the laser image, segmenting laser line segments, using a digit separation process to separate any merged laser line segments, and obtaining the 3D position of each laser line segment by triangulation to define a 3D point for each digit relative to the camera, and
   determine a gesture of the articulated body part associated with the tracked kinematic model.

19. A tracking system as claimed in claim 18, wherein the tracking module further comprises determining at least two angles of the kinematic model of the articulated body part independently of one another from the received LED images and the corresponding depth data.

20. A tracking system as claimed in claim 18 wherein the tracking module is at least partially implemented using hardware logic selected from any one or more of: a field-programmable gate array, a program-specific integrated circuit, a program-specific standard product, a system-on-a-chip, a complex programmable logic device.

* * * * *